US012728642B2

(12) United States Patent
Morino

(10) Patent No.: US 12,728,642 B2
(45) Date of Patent: Sep. 8, 2026

(54) WIPING DEVICE, HEAD MAINTENANCE DEVICE, AND LIQUID DISCHARGE APPARATUS

(71) Applicant: Tetsu Morino, Kanagawa (JP)

(72) Inventor: Tetsu Morino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 124 days.

(21) Appl. No.: 18/528,841

(22) Filed: Dec. 5, 2023

(65) Prior Publication Data

US 2024/0181783 A1 Jun. 6, 2024

(30) Foreign Application Priority Data

Dec. 5, 2022 (JP) ................................ 2022-194540

(51) Int. Cl.
*B41J 2/165* (2006.01)

(52) U.S. Cl.
CPC ....... *B41J 2/16544* (2013.01); *B41J 2/16535* (2013.01); *B41J 2/16552* (2013.01); *B41J 2002/1655* (2013.01); *B41J 2002/16558* (2013.01)

(58) Field of Classification Search
CPC ................ B41J 2/16544; B41J 2/16535; B41J 2/16552; B41J 2002/1655; B41J 2002/16558
See application file for complete search history.

(56) References Cited

U.S. PATENT DOCUMENTS

| | | | | |
|---|---|---|---|---|
| 6,281,909 | B1 * | 8/2001 | Fassler | B41J 2/16552 347/28 |
| 9,498,959 | B2 * | 11/2016 | Shinoto | B41J 2/16535 |
| 2013/0057604 | A1 | 3/2013 | Masunaga et al. | |
| 2013/0176367 | A1 | 7/2013 | Morino et al. | |
| 2020/0290387 | A1 | 9/2020 | Morino et al. | |
| 2020/0369032 | A1 | 11/2020 | Morino et al. | |
| 2021/0229472 | A1 | 7/2021 | Morino et al. | |
| 2021/0245534 | A1 | 8/2021 | Morino et al. | |
| 2021/0276346 | A1 | 9/2021 | Kobayashi et al. | |
| 2022/0297434 | A1 | 9/2022 | Morino et al. | |
| 2023/0202180 | A1 | 6/2023 | Matsumoto et al. | |
| 2023/0331010 | A1 | 10/2023 | Morino et al. | |

FOREIGN PATENT DOCUMENTS

| | | | |
|---|---|---|---|
| JP | 2013-141743 | A | 7/2013 |
| JP | 2016-087939 | A | 5/2016 |
| JP | 2019-130679 | A | 8/2019 |
| JP | 2019-155597 | A | 9/2019 |
| JP | 2020-183061 | A | 11/2020 |

* cited by examiner

*Primary Examiner* — Geoffrey S Mruk
(74) *Attorney, Agent, or Firm* — XSENSUS LLP

(57) ABSTRACT

A wiping device includes a cleaning liquid tank, an endless web, a circulation path, a liquid feeder, and a filter. The cleaning liquid tank stores a cleaning liquid. The endless web is rotatably movable and has a part immersed in the cleaning liquid in the cleaning liquid tank and another part outside the cleaning liquid to wipe an object in a wiping direction. The cleaning liquid is circulated through the circulation path. The liquid feeder is disposed in the circulation path, to generate a flow of the cleaning liquid circulating through the circulation path. The filter is disposed in the circulation path, to filter the cleaning liquid flowing through the filter.

20 Claims, 10 Drawing Sheets

WIPING DEVICE, HEAD MAINTENANCE DEVICE, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-194540, filed on Dec. 5, 2022, in the Japan Patent Office, the entire disclosure of which is hereby incorporated by reference herein.

BACKGROUND

Technical Field

Embodiments of the present disclosure relate to a wiping device, a head maintenance device, and a liquid discharge apparatus.

Related Art

A head that discharges liquid from a nozzle is provided with a maintenance and recovery mechanism (head maintenance device) including a cap that caps a nozzle face of the head and a wiping device that wipes and cleans the nozzle face in order to maintain and recover the state of the nozzle.

SUMMARY

Embodiments of the present disclosure describe an improved wiping device that includes a cleaning liquid tank, an endless web, a circulation path, a liquid feeder, and a filter. The cleaning liquid tank stores a cleaning liquid. The endless web is rotatably movable and has a part immersed in the cleaning liquid in the cleaning liquid tank and another part outside the cleaning liquid to wipe an object in a wiping direction. The cleaning liquid is circulated through the circulation path. The liquid feeder is disposed in the circulation path, to generate a flow of the cleaning liquid circulating through the circulation path. The filter is disposed in the circulation path, to filter the cleaning liquid flowing through the filter.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
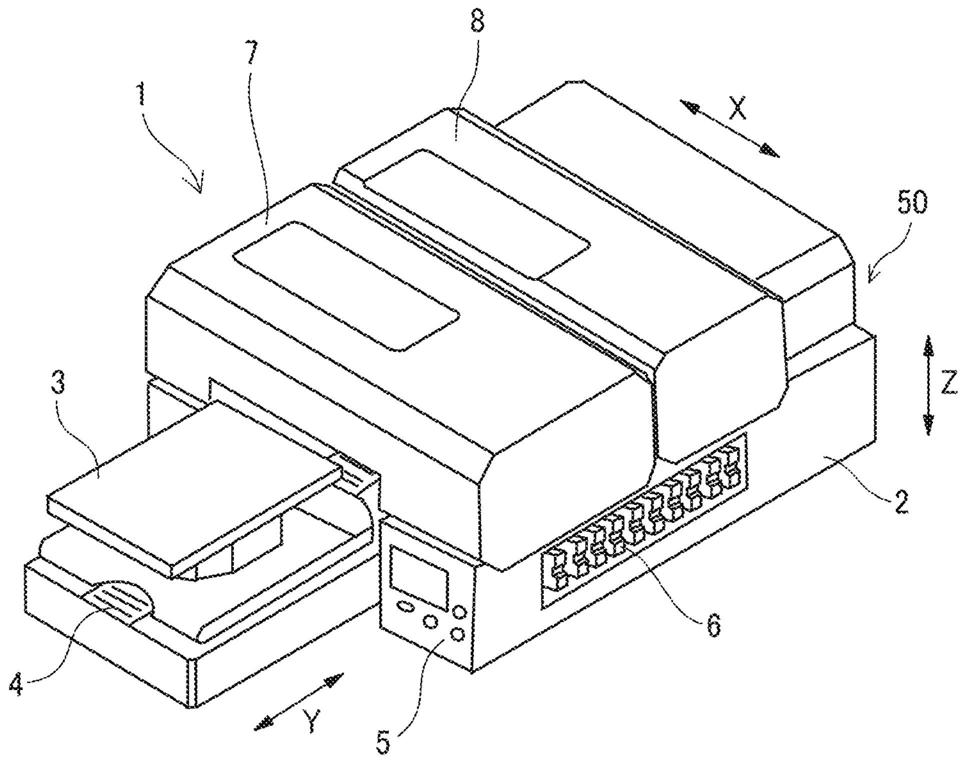
FIG. 1 is a perspective view of a printer as a liquid discharge apparatus according to embodiments of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
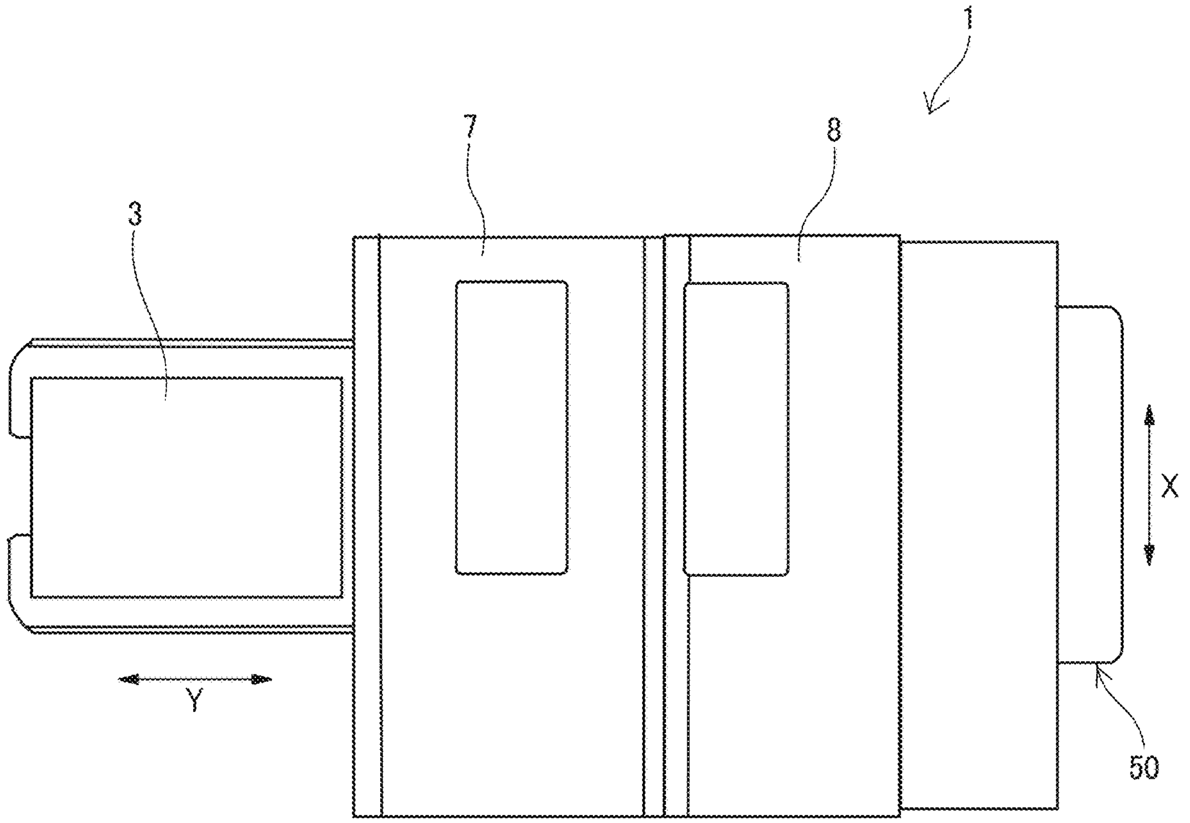
FIG. 2 is a plan view of the printer of FIG. 1 with the covers closed.
Figure 3:
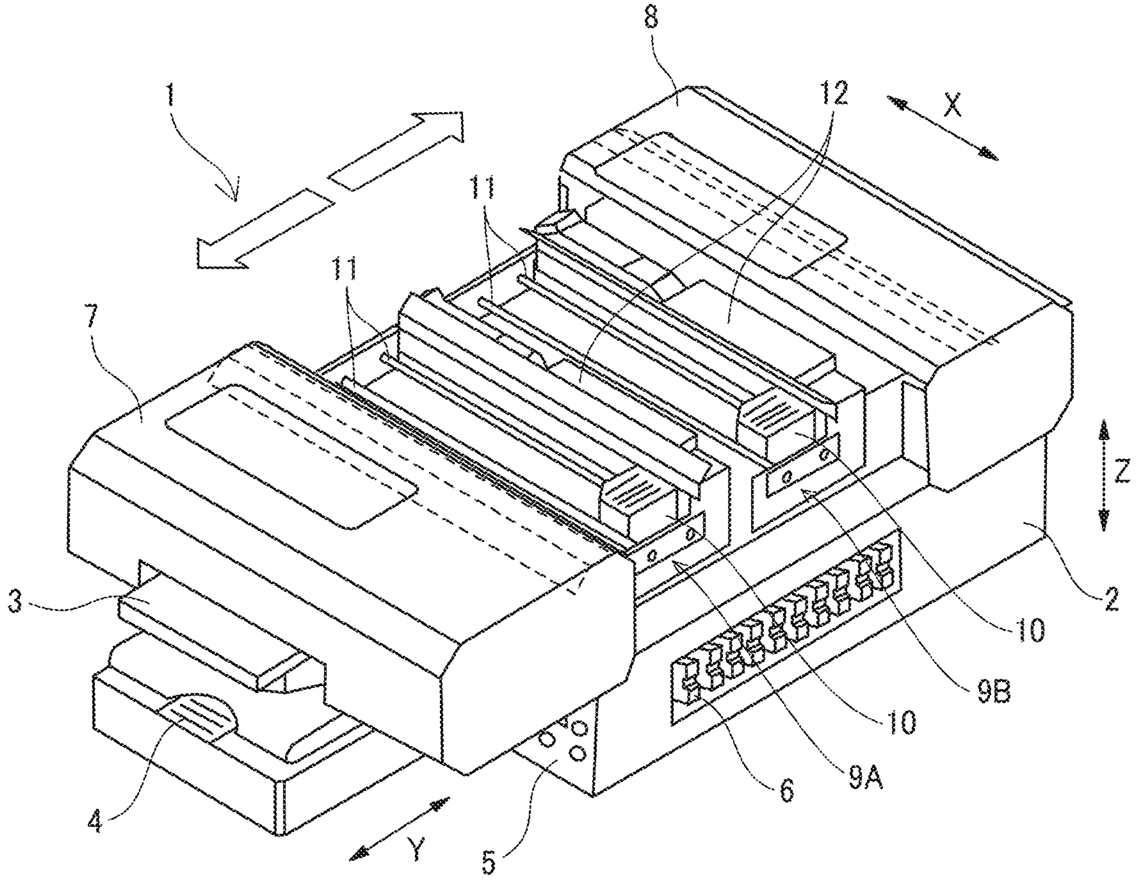
FIG. 3 is a perspective view of the printer of FIG. 1 with the covers open.
Figure 4:
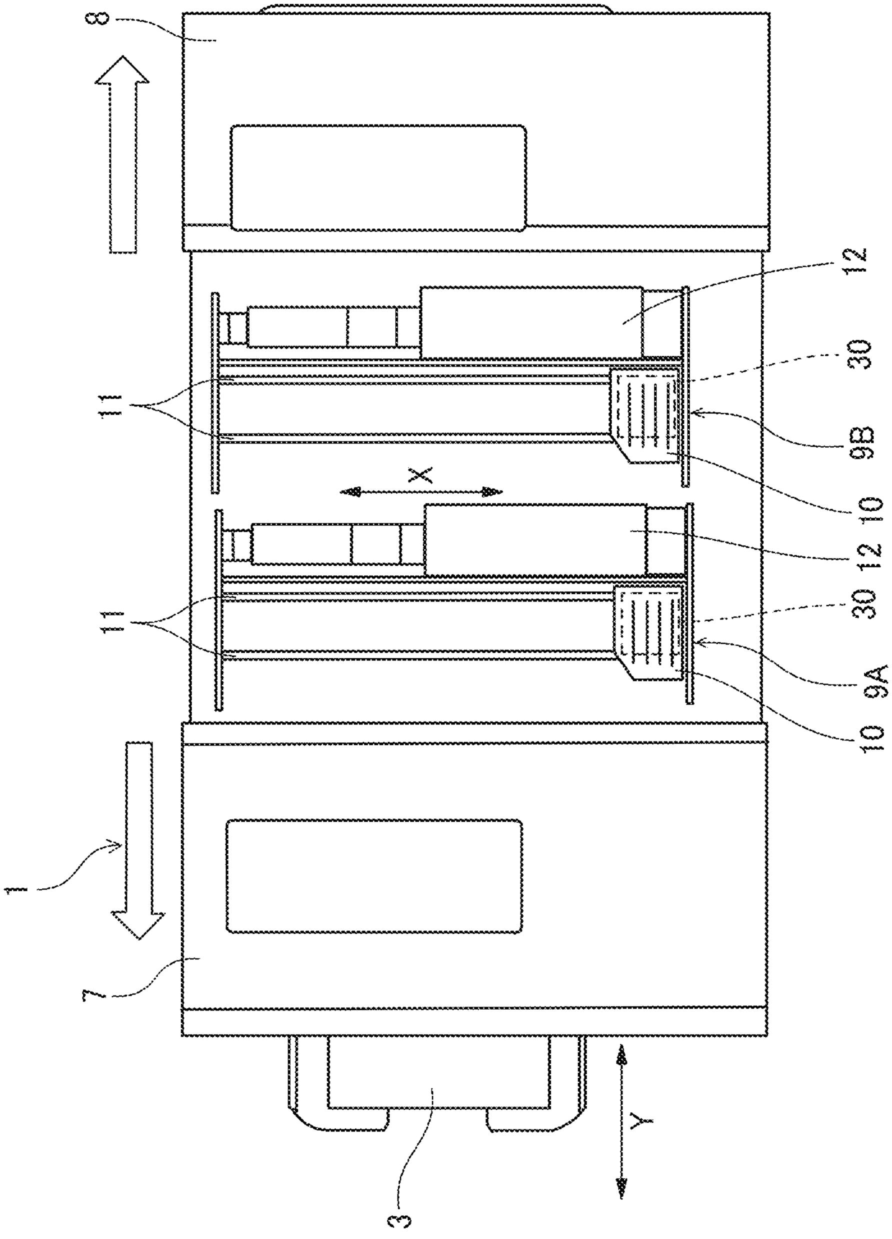
FIG. 4 is a plan view of the printer of FIG. 1 with the covers open.

Embodiments of the present disclosure are described below with reference to the accompanying drawings. A printer as a liquid discharge apparatus according to embodiments of the present disclosure is described with reference to FIGS. 1 to 4. FIG. 1 is a perspective view of the printer, according to an embodiment of the present disclosure, with covers closed. FIG. 2 is a plan view of the printer of FIG. 1 with the covers closed. FIG. 3 is a perspective view of the printer of FIG. 1 with the covers open. FIG. 4 is a plan view of the printer with the covers open.

In the present embodiment, a direction (main scanning direction) X in FIG. 1 is a transverse direction of the printer and a moving direction of a head, a direction (sub-scanning direction orthogonal to the main scanning direction) Y is a front-rear direction of the printer and a medium conveyance direction, and a direction Z is a vertical direction. The direction X and the direction Y are parallel to a surface, onto which a liquid is discharged, of a medium on a stage, but may have some error. The directions X, Y, and Z are orthogonal to each other.

A printer 1 according to the present embodiment includes a stage 3 that is movable in the direction Y in a housing 2. The stage 3 is mounted on a guide rail 4 extending in the direction Y. A control panel 5 is disposed on a front face of the housing 2. An ink cartridge 6 is detachably attached to a side face of the housing 2. A front cover 7 and a rear cover 8 as covers are disposed over the housing 2.

The stage 3 has a flat upper face on which the medium is placed. The upper face of the stage 3 is parallel to the direction X and the direction Y. The stage 3 moves on the guide rail 4 to reciprocate in the direction Y (both the front direction and the rear direction). The stage 3 is movable up and down in the direction Z to adjust the height of the medium placed on the stage 3.

The front cover 7 and the rear cover 8 are movable in the direction Y (both the front direction and the rear direction). In FIG. 1, the front cover 7 has been moved backward and the rear cover 8 has been moved forward to close the front cover 7 and the rear cover 8. On the other hand, in FIG. 3, the front cover 7 is moved forward and the rear cover 8 is moved backward to open the front cover 7 and the rear cover 8.

As described above, the front cover 7 and the rear cover 8 are slidably opened and closed. As a result, an occupied space of the printer 1 including an opening and closing space of the front cover 7 and the rear cover 8 can be reduced as compared with a configuration in which a front cover and a rear cover are opened and closed, for example, in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

An apparatus body 50 of the printer 1 includes the housing 2 and two liquid discharge units 9 (9A and 9B) mounted on the housing 2. In the present embodiment, specifically, the apparatus body 50 is a portion of the printer 1 other than the front cover 7 and the rear cover 8. The front cover 7 and the rear cover 8 are slidable in the direction Y relative to the apparatus body 50.

The front cover 7 and the rear cover 8 are opened to expose the liquid discharge units 9 to the outside of the printer 1. When the liquid discharge units 9 are exposed to the outside, an operator can clean a head maintenance device 30, a liquid discharge head, and the surrounding thereof, or can replace a carriage.

The front cover 7 and the rear cover 8 are closed during image formation. As a result, the liquid discharge units 9A and 9B are covered by the front cover 7 and the rear cover 8 to block access to operation units such as the carriages of the liquid discharge units 9A and 9B from the outside.

The liquid discharge units 9A and 9B are disposed in the closed space in the front cover 7 or the rear cover 8. Accordingly, mist of liquid (e.g., ink) is prevented from scattering to environs outside the printer 1 while the liquid discharge head discharges the liquid to the medium (i.e., during liquid discharge operation). Further, the liquid discharge units 9A and 9B may include a fan to circulate an airflow in the front cover 7 or the rear cover 8 so as to collect the generated mist of liquid in the front cover 7 or the rear cover 8.

The printer 1 according to the present embodiment includes the two liquid discharge units 9A and 9B arranged side by side in the direction Y. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the medium is a fabric, the pretreatment liquid is preferably applied to the medium before the image formation using the ink. In other words, one of the liquid discharge units 9A and 9B preferably discharges the pretreatment liquid.

The liquid discharge units 9A and 9B have a similar configuration and include a carriage 10, a guide rod 11, an electrical component unit 12 including, for example, a board and an electrical component cover, and the head maintenance device 30.

The guide rod 11 extends in the direction X. The carriage 10 is movable in the direction X along the guide rod 11. The carriage 10 includes multiple liquid discharge heads. The head maintenance device 30 is disposed at a position facing the guide rod 11 outside a liquid discharge region on one side in the transverse direction.

The head maintenance device 30 includes, for example, a wiping device 200 according to embodiments of the present disclosure that cleans a nozzle face of the liquid discharge head and a suction mechanism 120 that sucks the nozzle face.

An outline of an image forming process on a medium by the liquid discharge unit 9 is described below.

A medium is placed on the stage 3. The stage 3 is moved along the guide rail 4 to convey the medium to the rear side of the printer 1. The liquid discharge unit 9B discharges the pretreatment liquid to the medium. Specifically, while the carriage 10 moves in the direction X along the guide rod 11, the liquid discharge unit 9B discharges the pretreatment liquid from nozzles of the liquid discharge head to apply the pretreatment liquid to the entire width of the medium in the direction X. The application of the pretreatment liquid is repeated at multiple positions in the direction Y to apply the pretreatment liquid to the entire medium.

After that, the stage 3 is moved forward in the direction Y and the liquid discharge unit 9A discharges the color ink of multiple colors onto the medium by a similar method by the liquid discharge unit 9B. When white color is printed on the medium, for example, the liquid discharge unit 9A discharges the white ink onto the medium, the stage 3 is moved to the rear side of the liquid discharge unit 9A again, and the liquid discharge unit 9A discharges the color ink onto the medium. Thus, an image is formed on the medium.

Figure 5:
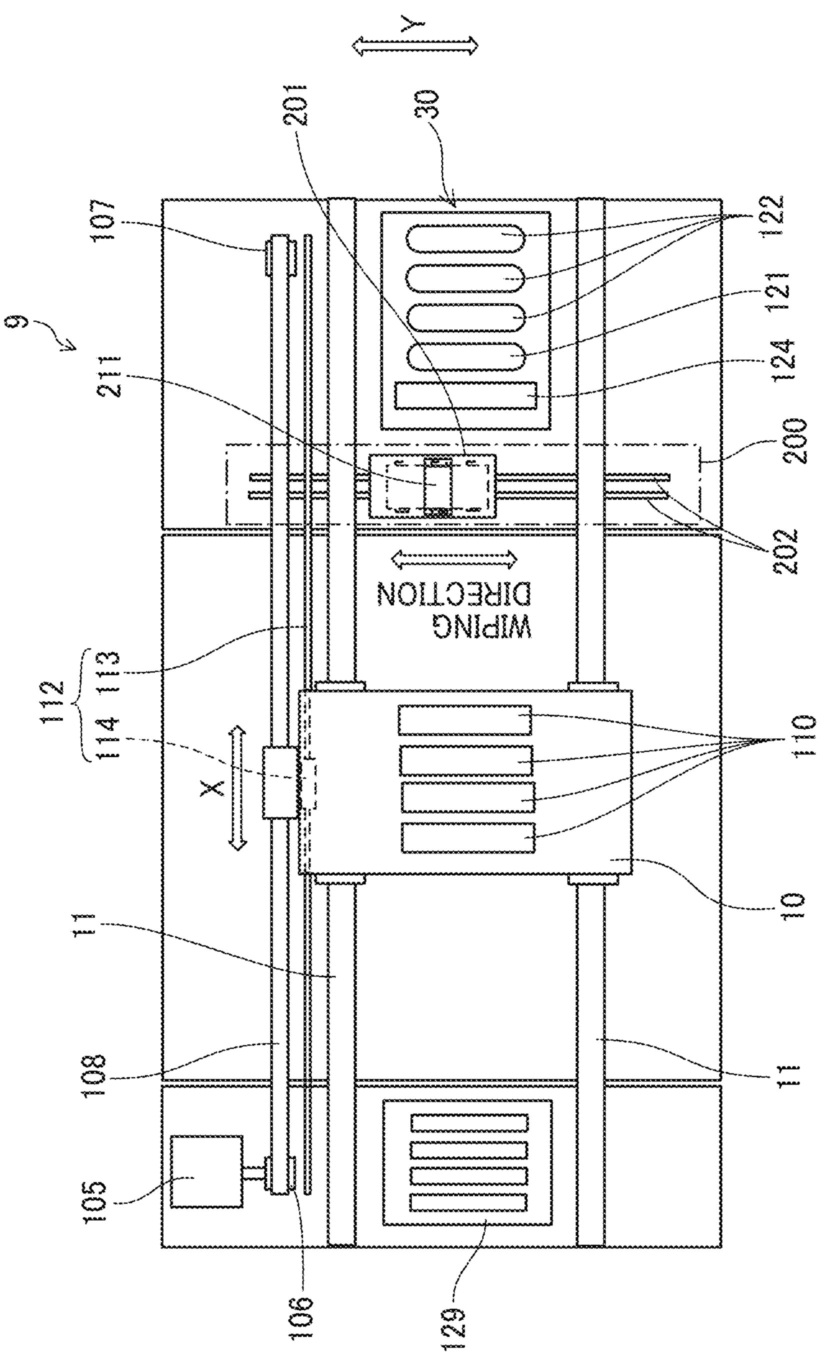
FIG. 5 is a plan view of a liquid discharge unit of the printer of FIG. 1.

A liquid discharge unit of the printer 1 according to the present embodiment is described below with reference to FIG. 5. FIG. 5 is a plan view of the liquid discharge unit.

As described above, the liquid discharge unit 9 includes the carriage 10 held by the two guide rods 11 bridged between left and right side plates so as to move the carriage reciprocally in the main scanning direction X. A main scanning motor 105 reciprocates the carriage 10 in the main scanning direction via a timing belt 108 looped around a drive pulley 106 and a driven pulley 107.

The carriage 10 is provided with four liquid discharge heads 110. The liquid discharge heads 110 may be referred to simply as "heads 110," each of which may be referred to as a "head 110" in the following description.

The liquid discharge unit 9 further includes an encoder scale 113 and an encoder sensor 114. A predetermined pattern is formed on the encoder scale 113 bridged between both the side plates in the main scanning direction X. The encoder sensor 114 includes a transmissive photosensor attached to the carriage 10 to read the pattern of the encoder scale 113. The encoder scale 113 and the encoder sensor 114 construct a linear encoder (i.e., a main scanning encoder) 112 that detects the movement of the carriage 10.

The head maintenance device 30, which is a maintenance and recovery mechanism that maintains and recovers the head 110, is disposed on one side of the range of movement of the carriage 10 in the main scanning direction X. A dummy discharge receptacle 129 is disposed on the other side of the range of movement of the carriage 10 in the main scanning direction.

The head maintenance device 30 includes, for example, the suction mechanism 120 including a suction cap 121 as a cap, three moisture-retentive caps 122 as a cap, and a dummy discharge receptacle 124, and the wiping device 200 according to an embodiment of the present disclosure. The suction cap 121 also serves as a moisture-retentive cap to cover a nozzle face 110*a* (on which the nozzles are formed) of the head 110.

The wiping device 200 includes a web cartridge 201 including a web 211 formed of cloth or nonwoven fabric, a guide rail 202 that guides the web cartridge 201 to move in a wiping direction, and a driving mechanism that moves the web cartridge 201 in the wiping direction. The web cartridge 201 may be placed on the guide rail 202 via a cartridge holder or directly placed on the guide rail 202.

When the printer 1 prints on a cloth, the stage 3 is moved outside the apparatus body 50, and the cloth is placed on the stage 3. The stage 3 is moved into the apparatus body 50 in response to an instruction to start printing. The stage 3 is moved intermittently in the sub-scanning direction Y. The carriage 10 is moved in the main scanning direction X, and the head 110 discharges the liquid of a desired color to the cloth not in motion. The intermittent movement of the stage 3, the movement of the carriage 10, and the liquid discharge of the head 110 are repeated to print a desired image on the cloth.

When the head 110 is maintained and recovered, the head 110 is moved to above the web cartridge 201. The web cartridge 201 is moved in the wiping direction with the web 211 in contact with the nozzle face 110*a* of the head 110. The wiping direction is the same as the direction Y. Thus, for example, residual liquid, thickened substances of the liquid, adhered substances of the liquid, and dirt such as dust adhering to the nozzle face 110*a* of the head 110 are wiped off.

Figure 6:
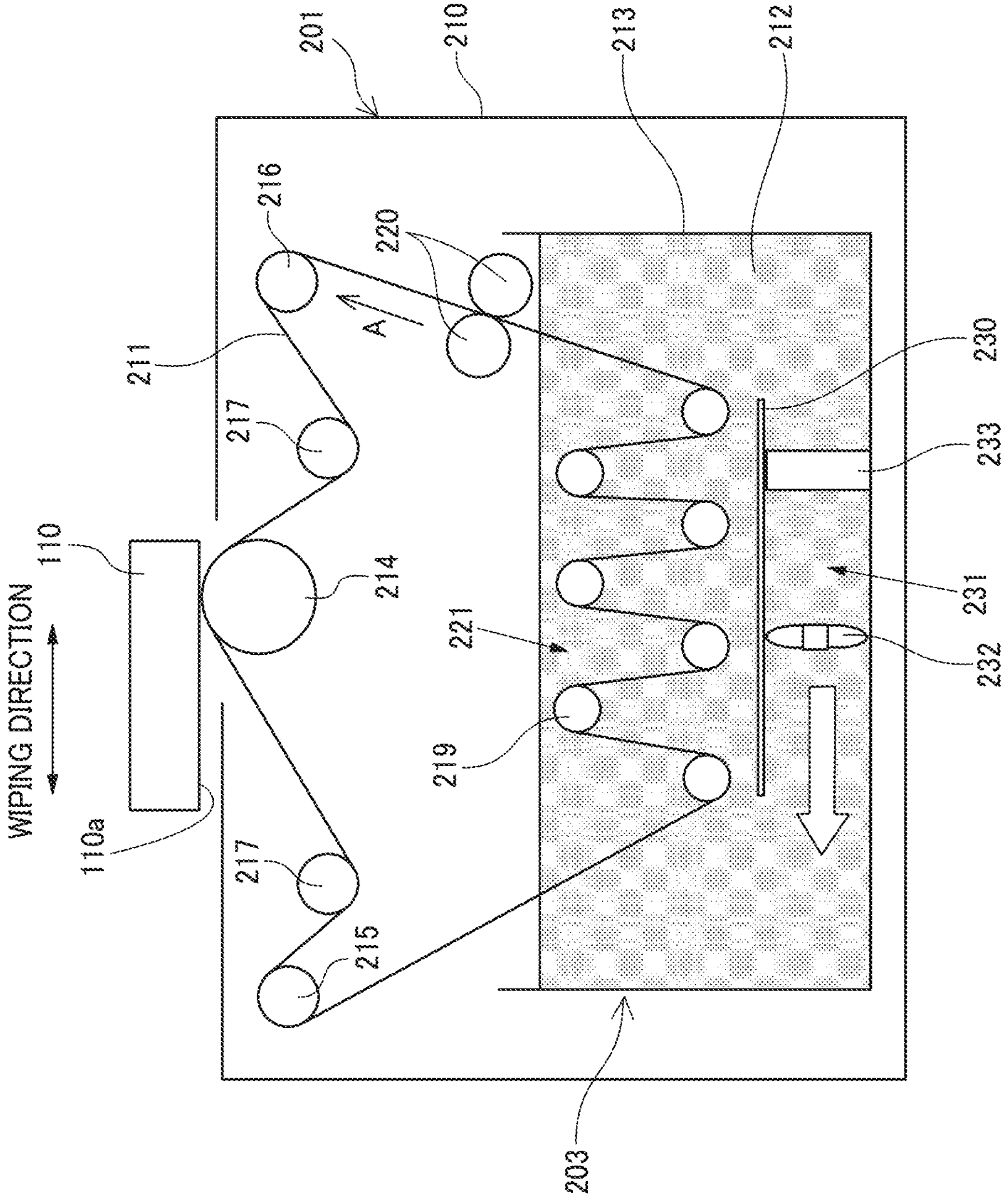
FIG. 6 is a diagram illustrating a web cartridge of a wiping device of the printer of FIG. 1, according to a first embodiment of the present disclosure.

A wiping device of a printer according to a first embodiment of the present disclosure is described below with reference to FIG. 6. FIG. 6 is a diagram illustrating a web cartridge of the wiping device according to the first embodiment.

The web cartridge 201 includes the endless web (long wiping member) 211 and a web cleaning device 203 in a housing (cartridge case) 210. The web 211 wipes the nozzle face 110*a* of the head 110. The nozzle face 110*a* serves as an object to be wiped. The web cleaning device 203 cleans the web 211. The web cleaning device 203 includes a cleaning liquid tank 213 to store a cleaning liquid 212.

The cleaning liquid 212 preferably includes water and glycerin, and may include other organic solvents, surfactants, and pH adjusters, if desired. The water in the cleaning liquid 212 reduces an environmental load. The glycerin in the cleaning liquid reduces the volatility of the cleaning liquid 212 and gives high detergency to the cleaning liquid 212. In particular, the cleaning liquid 212 preferably contains 50 mass % or more and 65 mass % or less of the water and 15 mass % or more and 20 mass % or less of the glycerin.

The web 211 is looped around a pressing roller 214, a drive roller 215, a driven roller 216, a plurality of guide rollers 217, and a plurality of guide rollers 219 disposed in the cleaning liquid tank 213 of the web cleaning device 203. The web 211 is movable circumferentially so as to be fed in the direction indicated by arrow A in FIG. 6 with a part of the web 211 immersed in the cleaning liquid 212.

The pressing roller 214 is disposed at a height at which the pressing roller 214 elastically contacts the nozzle face 110*a* of the head 110. A pair of squeeze rollers 220 that press the web 211 therebetween are disposed near the exit of the web 211 from the cleaning liquid tank 213.

When the web 211 wipes the nozzle face 110*a* of the head 110, the web 211 is pressed against the nozzle face 110*a* of the head 110 by the pressing roller 214. Then, the web 211 moves in the wiping direction by the movement of the web cartridge 201 in the wiping direction while pressing the nozzle face 110*a* with the web 211 to wipe the nozzle face 110*a*. As a result, the dirt on the nozzle face 110*a* is wiped off.

The web 211 that has wiped the nozzle face 110*a* of the head 110 is moved circumferentially as the drive roller 215 is rotated by a driving source. As a result, the portion of the web 211 that has wiped the nozzle face 110*a* is returned to the cleaning liquid tank 213.

The web 211 returned to the cleaning liquid tank 213 passes through the cleaning liquid 212 in the cleaning liquid tank 213 while being guided by the guide rollers 219. As a result, for example, the adhered substances of ink transferred from the nozzle face 110*a* are dissolved and removed from the web 211. Then, the web 211 cleaned with the cleaning liquid 212 passes through the pair of squeeze rollers 220 to squeeze the cleaning liquid 212 from the web 211, and then moves again toward the wiping position where the nozzle face 110*a* of the head 110 is wiped.

A portion related to the circulation of the cleaning liquid 212 in the cleaning liquid tank 213 is described below.

A partition wall 230 is disposed below the group of the guide rollers 219 in the cleaning liquid tank 213. Accordingly, the partition wall 230 defines a cleaning region 221 and a circulation path 231 in the cleaning liquid tank 213. The group of the guide rollers 219 is disposed in the cleaning region 221 above the partition wall 230. The circulation path 231 is disposed between the partition wall 230 and the bottom of the cleaning liquid tank 213. The cleaning liquid is circulated between the cleaning region 221 and the circulation path 231.

A screw 232 is disposed in the circulation path 231. The screw 232 serves as a liquid feeder that generates a flow of the cleaning liquid 212 in the direction indicated the blank arrow in FIG. 6. A filter 233 is disposed in the circulation path 231 to filter the cleaning liquid 212. In the present embodiment, an outlet of the circulation path 231 is disposed on a first side (left side in FIG. 6) of the cleaning liquid tank 213 where the web 211 enters the cleaning liquid tank 213, and an inlet of the circulation path 231 is disposed on a second side (right side in FIG. 6) of the cleaning liquid tank 213 where the web 211 exits from the cleaning liquid tank 213.

Due to such a configuration, when the cleaning liquid 212 is filtered and cleaned by the filter 233, the screw 232 is driven to generate the flow of the cleaning liquid 212 in the direction indicated by the blank arrow in FIG. 6. Thus, the cleaning liquid 212 flows into the circulation path 231 from one side of the cleaning region 221 where the web 211 exits from the cleaning liquid tank 213, passes through the filter 233, and flows out of the circulation path 231 on the other side of the cleaning region 221 where the web 211 enters the cleaning region 221 of the cleaning liquid tank 213.

In the circulation path 231, the cleaning liquid 212 passes through the filter 233. Accordingly, foreign substances such as threads of sewing waste of cloth, fluff, other dust, and unmelted solid ink component mixed in the cleaning liquid 212 are captured by the filter 233, and the filtered cleaning liquid 212 is returned to the cleaning region 221.

Due to such a configuration, foreign substances in the cleaning liquid 212 in the cleaning region 221 is reduced. As a result, the cleaning liquid 212 for cleaning the web 211 is prevented from decreasing the cleaning performance thereof, the foreign substances are prevented from adhering to the web 211 immersed in the cleaning liquid 212 again, and the cleaning effect by the wiping of the web 211 can be maintained.

Figure 7:
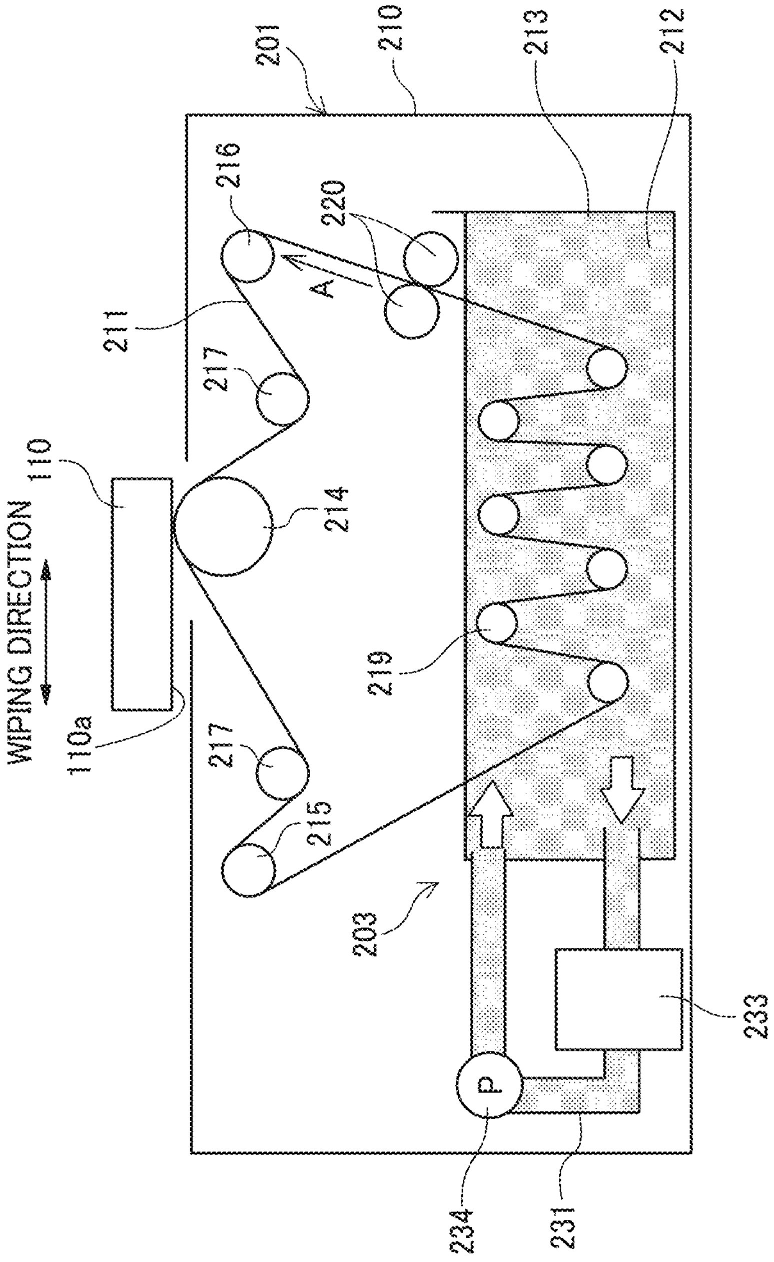
FIG. 7 is a diagram illustrating a web cartridge of a wiping device according to a second embodiment of the present disclosure.

A wiping device according to a second embodiment of the present disclosure is described below with reference to FIG. 7. FIG. 7 is a diagram illustrating a web cartridge of the wiping device according to the second embodiment.

In the second embodiment, the circulation path 231 is disposed outside the cleaning liquid tank 213. The circulation path 231 is coupled to the bottom portion and the upper portion of the cleaning liquid tank 213. A pump 234 and the filter 233 are disposed in the circulation path 231. The pump 234 serves as the liquid feeder that generates a flow of the cleaning liquid 212 in the direction indicated by the blank arrows in FIG. 7. The filter 233 filters the cleaning liquid 212.

In the present embodiment, the cleaning liquid 212 flows into the circulation path 231 from the bottom portion of the cleaning liquid tank 213, and the cleaning liquid 212 flows out of the circulation path 231 to the upper portion of the cleaning liquid tank 213 to filter the cleaning liquid 212 through the filter 233.

The filter 233 is replaceably attached to the circulation path 231 by, for example, joints. When the filter 233 is coupled to the circulation path 231 by the joints, mechanisms that automatically closes plugs of the filter 233 and the circulation path 231 when the filter 233 is decoupled from the circulation path 231 are preferably provided in order to minimize the leakage of the cleaning liquid.

As described above, the filter 233 is replaceable. When the filter 233 is clogged with foreign substances, the filter 233 can be replaced with a new filter 233 to recover the filtration performance. In this case, for example, a hole for replacing the filter 233 is preferably disposed in the housing 210 of the web cartridge 201.

Figure 8:
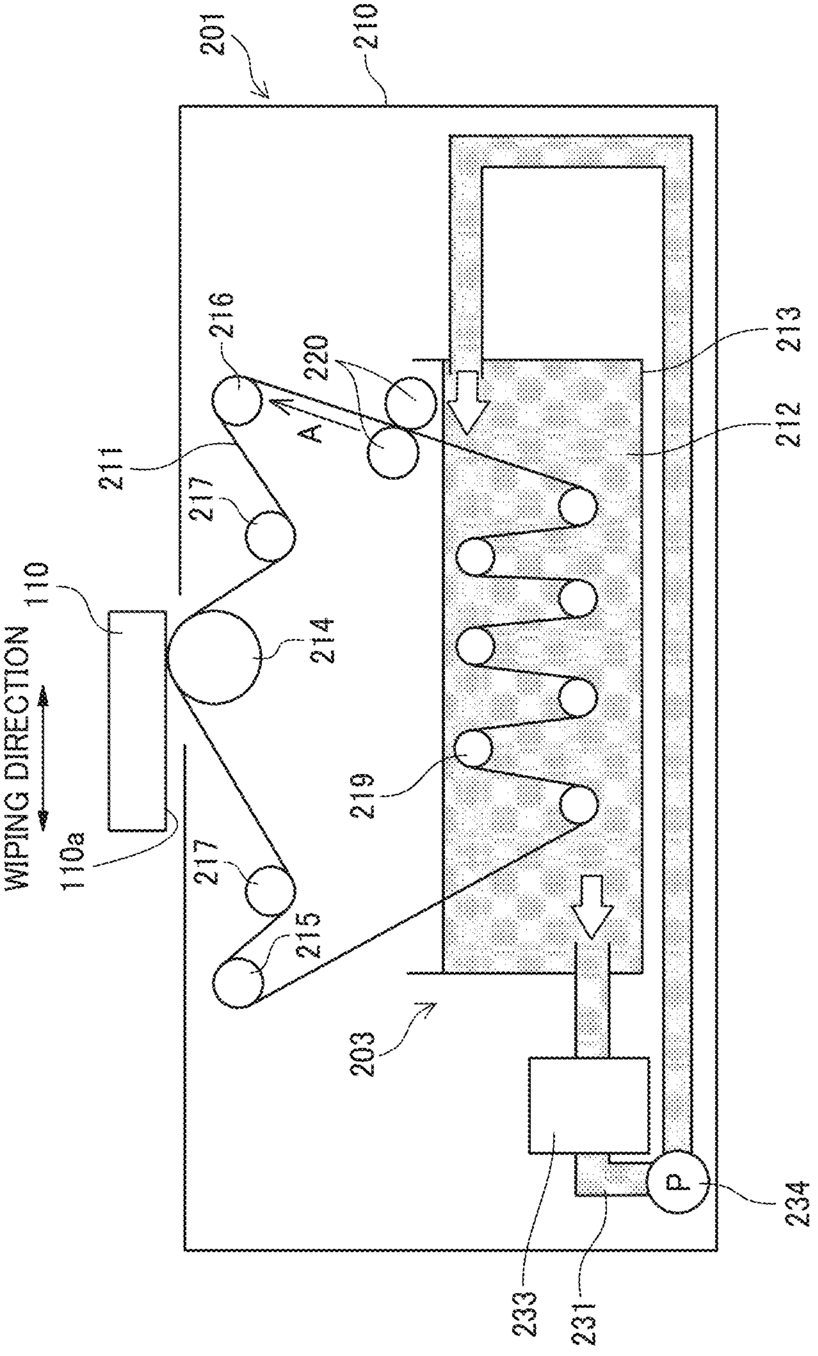
FIG. 8 is a diagram illustrating a web cartridge of a wiping device according to a third embodiment of the present disclosure.

A wiping device according to a third embodiment of the present disclosure is described below with reference to FIG. 8. FIG. 8 is a diagram illustrating a web cartridge of the wiping device according to the third embodiment.

In the third embodiment, the circulation path 231 is disposed outside the cleaning liquid tank 213. The circulation path 231 is coupled to the cleaning liquid tank 213 on the first side (left side in FIG. 8) where the web 211 enters the cleaning liquid tank 213 and on the second side (right side in FIG. 8) where the web 211 exits from the cleaning liquid tank 213.

The pump 234 and the filter 233 are disposed in the circulation path 231. The pump 234 serves as the liquid feeder that generates a flow of the cleaning liquid 212 in the direction indicated by the blank arrows in FIG. 8. The filter 233 filters the cleaning liquid 212. In the present embodiment, the inlet of the circulation path 231 is disposed on the first side (left side in FIG. 8) of the cleaning liquid tank 213 where the web 211 enters the cleaning liquid tank 213, and the outlet of the circulation path 231 is disposed on the second (right side in FIG. 8) of the cleaning liquid tank 213 where the web 211 exits from the cleaning liquid tank 213.

As the pump 234 is driven, the cleaning liquid 212 in the cleaning liquid tank 213 flows into the circulation path 231 from the first side of the cleaning liquid tank 213 where the web 211 enters the cleaning liquid tank 213, flows out of the circulation path on the second side of the cleaning liquid tank 213 where the web 211 exits from the cleaning liquid tank 213, and returns to the cleaning liquid tank 213.

The contamination of the cleaning liquid 212 is often caused by the web 211 that has wiped an object (e.g., the nozzle face of the head) and returns to the cleaning liquid tank 213. For this reason, a suction port (i.e., the inlet) of the circulation path 231 is disposed on the return side of the web 211 that has wiped the object (the first side where the web 211 enters the cleaning liquid tank 213). As a result, foreign substances adhered to the web 211 are collected in the cleaning liquid tank 213 and are easily sucked into the circulation path 231. The cleaning liquid 212 filtered by the filter 233 returns to the cleaning liquid tank 213 on the feeding side of the web 211 (the second side where the web exits from the cleaning liquid tank 213). Such a configuration can facilitate the collection of foreign substances in the cleaning liquid 212. As a result, the cleaned web 211 can be fed to the wiping position.

Figure 9:
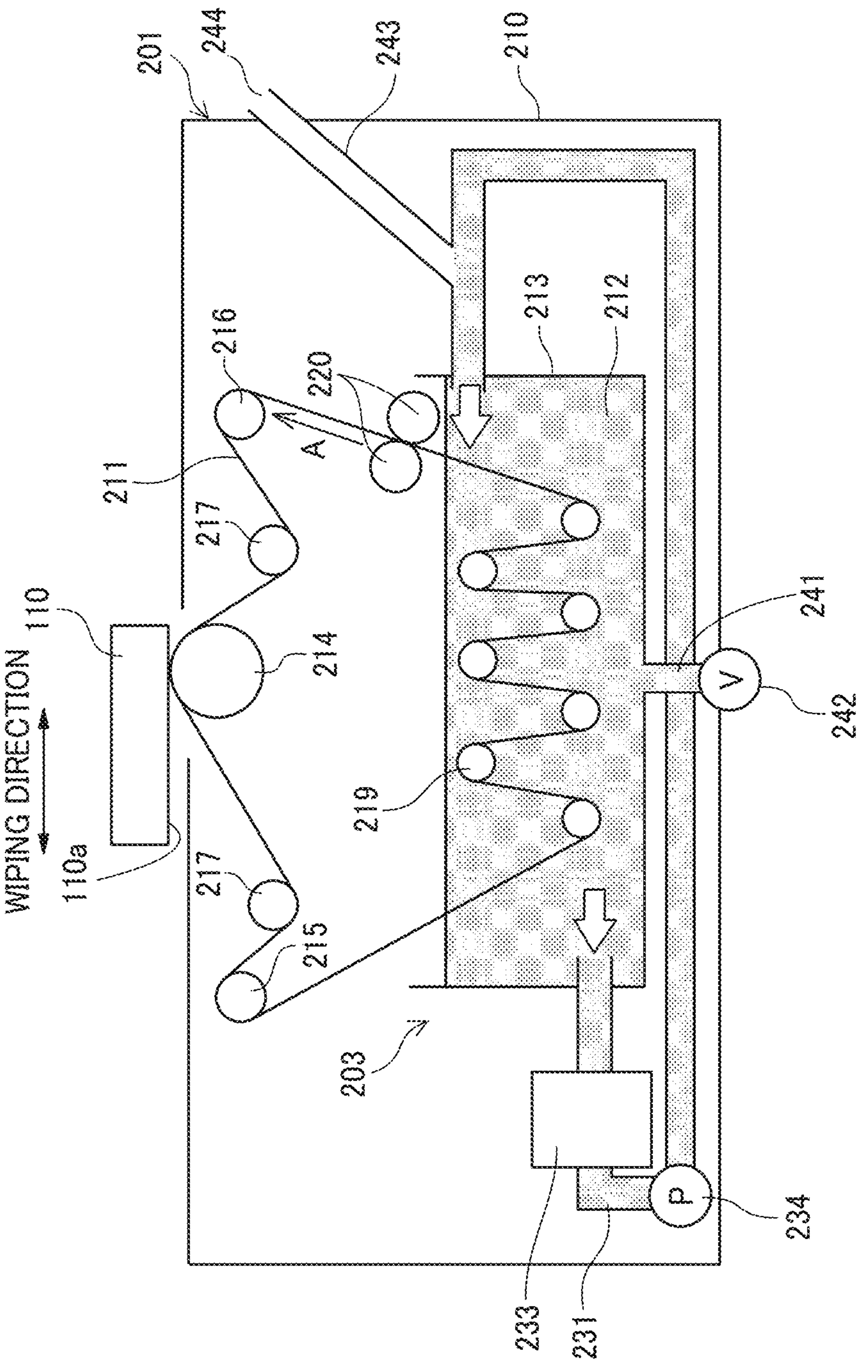
FIG. 9 is a diagram illustrating a web cartridge of a wiping device according to a fourth embodiment of the present disclosure.

A wiping device according to a fourth embodiment of the present disclosure is described below with reference to FIG. 9. FIG. 9 is a diagram illustrating a web cartridge of the wiping device according to the fourth embodiment.

In the fourth embodiment, similarly to the third embodiment, the circulation path 231 is disposed outside the cleaning liquid tank 213. The circulation path 231 is coupled to the cleaning liquid tank 213 on the first side (left side in FIG. 9) where the web 211 enters the cleaning liquid tank 213 and on the second side (right side in FIG. 9) where the web 211 exits from the cleaning liquid tank 213.

The pump 234 and the filter 233 are disposed in the circulation path 231. The pump 234 serves as the liquid feeder that generates a flow of the cleaning liquid 212 in the direction indicated by the blank arrows in FIG. 9. The filter 233 filters the cleaning liquid 212. Also in the present embodiment, the inlet of the circulation path 231 is disposed on the first side (left side in FIG. 9) of the cleaning liquid tank 213 where the web 211 enters the cleaning liquid tank 213, and the outlet of the circulation path 231 is disposed on the second side (right side in FIG. 9) of the cleaning liquid tank 213 where the web 211 exits from the cleaning liquid tank 213.

A drain path 241 for draining the cleaning liquid 212 to the outside is disposed at the bottom of the cleaning liquid tank 213 and includes an opening-closing valve 242 for opening and closing the drain path 241. A supply path 243 for supplying the cleaning liquid 212 into the circulation path 231 is coupled to the circulation path 231. Alternatively, the supply path 243 may be coupled to the cleaning liquid tank 213.

When the web 211 is repeatedly cleaned, the cleaning liquid 212 is gradually contaminated with, for example, ink or dust, and thus the cleaning effect of the web 211 is reduced. When the cleaning liquid 212 is contaminated, the opening-closing valve 242 is opened to drain the cleaning liquid 212 from the drain path 241, and a new cleaning liquid 212 is supplied from a cleaning liquid inlet port 244 of the supply path 243.

Such a configuration facilitates the replacement of the cleaning liquid 212 in the cleaning liquid tank 213, and the cleaning efficiency of the cleaning liquid 212 for cleaning the web 211 can be recovered.

Figure 10:
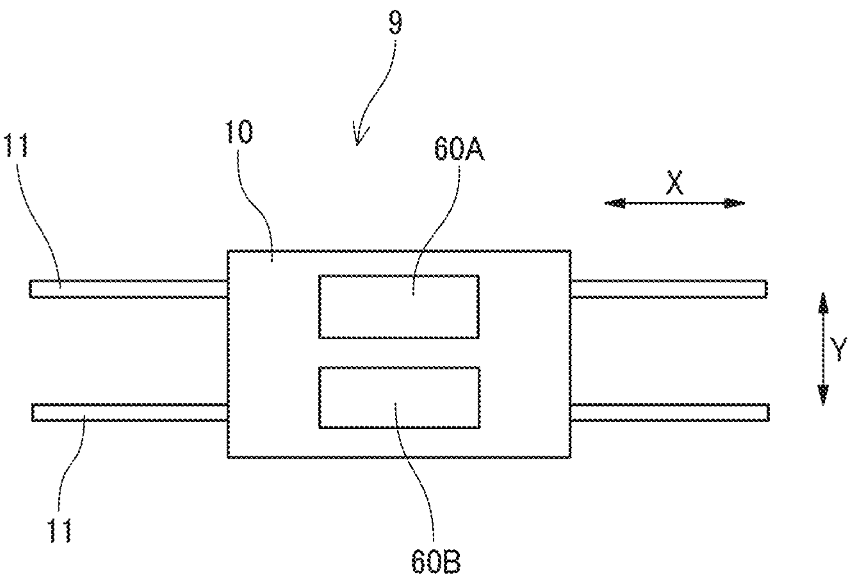
FIG. 10 is a plan view of a carriage according to a fifth embodiment of the present disclosure, as viewed from ahead unit side.
Figure 11:
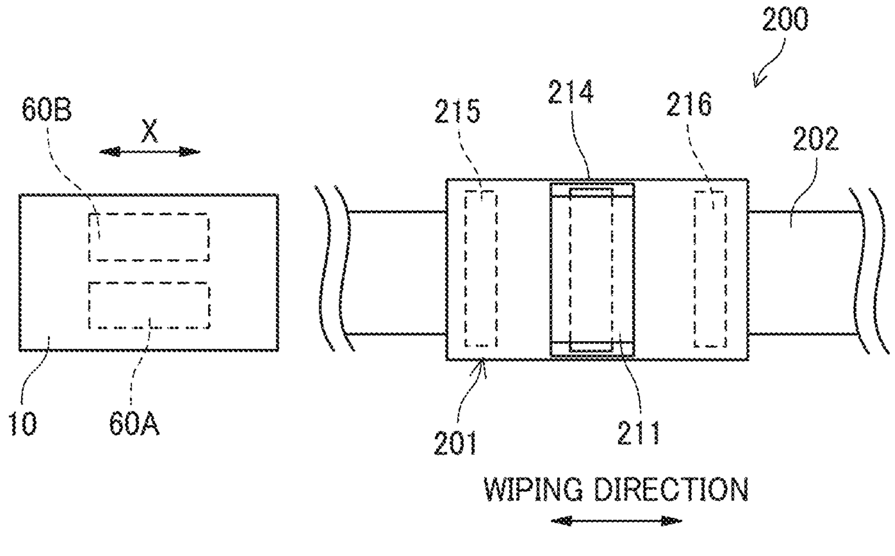
FIG. 11 is a plan view of a wiping device according to the fifth embodiment.

A fifth embodiment of the present disclosure is described below with reference to FIGS. 10 and 11. FIG. 10 is a plan view of a carriage according to the fifth embodiment as viewed from the head unit side, and FIG. 11 is a plan view of a wiping device according to the fifth embodiment.

In the fifth embodiment, the carriage 10 includes multiple head units 60 (60A and 60B). The longitudinal direction of the head unit 60 is the same as the main scanning direction X. In this case, for example, the head unit 60A discharges the white ink or the color ink, and the head unit 60B discharges the pretreatment liquid.

The wiping direction of the wiping device 200, which is similar to that of the first embodiment, is the same as the main scanning direction X. Accordingly, in the present embodiment, the web 211 is moved circumferentially in the main scanning direction X.

The above-described embodiments can be combined with each other within an allowable range. In the above-described embodiments, the web and the cleaning liquid tank are formed into a cartridge (i.e., the web cartridge), but may not be formed into a cartridge.

In the present disclosure, the liquid to be discharged is not limited to a particular liquid as long as the liquid has a viscosity or surface tension to be discharged from a head (liquid discharge head). However, preferably, the viscosity of the liquid is not greater than 30 mPa·s under ordinary temperature and ordinary pressure or by heating or cooling. Examples of the liquid to be discharged include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and a counter electrode.

The term "liquid discharge apparatus" used herein represents an apparatus including the liquid discharge head to drive the liquid discharge head to discharge liquid. The liquid discharge apparatus may be, for example, any apparatus that can discharge liquid to a material onto which liquid can adhere or any apparatus to discharge liquid toward gas or into liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material on which liquid is at least temporarily adhered, a material on which liquid is adhered and fixed, or a material into which liquid adheres and permeates. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The liquid discharge apparatus may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

Aspects of the present disclosure are, for example, as follows.

Aspect 1

A wiping device includes an endless web to wipe an object to be wiped and a cleaning liquid tank to store a cleaning liquid. The web is movable circumferentially with a part of the web immersed in the cleaning liquid. The cleaning liquid is circulated through a circulation path. A liquid feeder and a filter are disposed in the circulation path. The liquid feeder generates a flow of the cleaning liquid. The filter filters the cleaning liquid through the filter.

In other words, a wiping device includes a cleaning liquid tank, an endless web, a circulation path, a liquid feeder, and a filter. The cleaning liquid tank stores a cleaning liquid. The endless web is rotatably movable and has a part immersed in the cleaning liquid in the cleaning liquid tank and another part outside the cleaning liquid to wipe an object in a wiping direction. The cleaning liquid is circulated through the circulation path. The liquid feeder is disposed in the circulation path, to generate a flow of the cleaning liquid circulating through the circulation path. The filter is disposed in the circulation path, to filter the cleaning liquid flowing through the filter.

Aspect 2

In the wiping device according to Aspect 1, the circulation path is disposed outside the cleaning liquid tank, and the filter is replaceably mounted into the circulation path.

In other words, the circulation path is outside the cleaning liquid tank and coupled to the cleaning liquid tank. The filter is replaceably attached to the circulation path.

Aspect 3

The wiping device according to Aspect 1 or 2, the circulation path is disposed outside the cleaning liquid tank. An inflow side of the circulation path is disposed on a side of the cleaning liquid tank where the web enters the cleaning liquid tank, and an outflow side of the circulation path is disposed on a side of the cleaning liquid tank where the web exits from the cleaning liquid tank.

In other words, the endless web enters the cleaning liquid from a first side of the liquid cleaning tank and exits from the cleaning liquid from a second side of the cleaning liquid tank opposite to the first side in the wiping direction. The circulation path is outside the cleaning liquid tank and coupled to the cleaning liquid tank. The circulation path has an inlet on the first side, through which the cleaning liquid flows from the cleaning liquid tank into the circulation path, and an outlet on the second side, through which the cleaning liquid flows from the circulation path into the cleaning liquid tank.

Aspect 4

The wiping device according to any one of Aspects 1 to 3, further includes a drain path that is openably closable to drain the cleaning liquid from the cleaning liquid tank and a supply path through which the cleaning liquid is supplied to the cleaning liquid tank.

Aspect 5

In the wiping device according to Aspect 4, the circulation path is disposed outside the cleaning liquid tank, and the supply path is coupled to the circulation path.

In other words, the circulation path is outside the cleaning liquid tank and coupled to the cleaning liquid tank. The supply path is coupled to the circulation path.

Aspect 6

In the wiping device according to any one of Aspects 1 to 5, the cleaning liquid includes water and glycerin.

Aspect 7

In the wiping device according to Aspect 6, the cleaning liquid includes 50 mass % or more and 65 mass % or less of the water and 15 mass % or more and 20 mass % or less of the glycerin.

Aspect 8

A head maintenance device includes the wiping device according to any one of claims 1 to 7, to maintain a liquid discharge head.

In other words, a head maintenance device include the wiping device according to any one of Aspects 1 to 7, to wipe a nozzle face of a liquid discharge head as the object and a cap to cover the nozzle face of the liquid discharge head.

Aspect 9

A liquid discharge apparatus includes a liquid discharge head to discharge a liquid and the wiping device according to any one of Aspects 1 to 7.

In other words, a liquid discharge apparatus includes a liquid discharge head having a nozzle on a nozzle face to discharge a liquid from the nozzle and the wiping device according to any one of Aspects 1 to 7, to wipe the nozzle face of the liquid discharge head.

Aspect 10

A liquid discharge apparatus includes a liquid discharge head to discharge a liquid and the head maintenance device according to Aspect 8.

In other words, a liquid discharge apparatus includes a liquid discharge head having a nozzle on a nozzle face to discharge a liquid from the nozzle and the head maintenance device according to Aspect 8.

According to one aspect of the present disclosure, the cleaning performance of the cleaning liquid for cleaning the wiping member (i.e., the endless web) is less likely to deteriorate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A wiping device comprising:

a cleaning liquid tank storing a cleaning liquid;

an endless web rotatably movable and having:

a part immersed in the cleaning liquid in the cleaning liquid tank at a cleaning region; and another part outside the cleaning liquid to wipe an object in a wiping direction;

a circulation path in the cleaning liquid tank through which the cleaning liquid is circulated;

a partition wall separating the cleaning region from the circulation path;

a liquid feeder in the circulation path, to generate a flow of the cleaning liquid circulating through the circulation path;

a filter in the circulation path, to filter the cleaning liquid flowing through the filter.

2. The wiping device according to claim 1, wherein:

the circulation path is outside the cleaning liquid tank and coupled to the cleaning liquid tank, and the filter is replaceably attached to the circulation path.

3. The wiping device according to claim 1, wherein:

the endless web enters the cleaning liquid from a first side of the cleaning liquid tank, the endless web exits from the cleaning liquid from a second side of the cleaning liquid tank opposite to the first side in the wiping direction, the circulation path is outside the cleaning liquid tank and coupled to the cleaning liquid tank, and the circulation path includes:

an inlet on the first side, through which the cleaning liquid flows from the cleaning liquid tank into the circulation path; and an outlet on the second side, through which the cleaning liquid flows from the circulation path into the cleaning liquid tank.

4. The wiping device according to claim 1, further comprising:

a supply path through which the cleaning liquid is supplied into the cleaning liquid tank, wherein:

the circulation path is outside the cleaning liquid tank and coupled to the cleaning liquid tank, and the supply path is coupled to the circulation path.

5. A head maintenance device comprising:

the wiping device according to claim 1, to wipe a nozzle face of a liquid discharge head as the object; and a cap to cover the nozzle face of the liquid discharge head.

6. A liquid discharge apparatus comprising:

a liquid discharge head having a nozzle on a nozzle face to discharge a liquid from the nozzle; and the head maintenance device according to claim 5.

7. The head maintenance device according to claim 5, wherein:

the cap is a moisture-retentive cap.

8. A liquid discharge apparatus comprising:

a liquid discharge head having a nozzle on a nozzle face to discharge a liquid from the nozzle; and a wiping device according to claim 1, to wipe the nozzle face of the liquid discharge head.

9. The liquid discharge apparatus according to claim 8, wherein:

the liquid discharge apparatus is an inkjet printer.

10. The wiping device according to claim 1, further comprising:

an enclosure surrounding the cleaning liquid tank, the circulation path, the liquid feeder, and the filter; and a drain path openably closable to drain the cleaning liquid from the cleaning liquid tank; and a supply path through which the cleaning liquid is supplied into the cleaning liquid tank, wherein:

the drain path drains outside of the enclosure, and the supply path includes an opening outside of the enclosure into which the cleaning liquid is introduced.

11. The wiping device according to claim 1, wherein:

the liquid feeder is a pump.

12. The wiping device according to claim 1, wherein:

the liquid feeder is a screw.

13. The wiping device according to claim 1, further comprising:

a pressing roller, wherein a portion of the endless web is wrapped around the pressing roller to define the another part that is outside the cleaning liquid to wipe the object.

14. The wiping device according to claim 1, further comprising:

a pair of squeeze rollers to press the endless web after the endless web exits the cleaning liquid in the cleaning liquid tank.

15. The wiping device according to claim 1, further comprising:

a drain path openably closable to drain the cleaning liquid from the cleaning liquid tank, wherein the drain path includes an opening-closing valve.

16. The wiping device according to claim 1, further comprising:

a supply path through which the cleaning liquid is supplied into the cleaning liquid tank, wherein the supply path is coupled to the cleaning liquid tank.

17. The wiping device according to claim 1, wherein:

the cleaning liquid includes at least one of a surfactant or a pH adjuster.

18. The wiping device according to claim 1, further comprising:

a housing containing the cleaning liquid tank, the endless web, the circulation path, the liquid feeder, and the filter, wherein the housing is configured as a replaceable cartridge.

19. The wiping device according to claim 1, wherein:

the cleaning region is above the circulation path.

20. The wiping device according to claim 1, wherein:

the filter is under the cleaning region.

* * * * *